United States Patent [19]

Boyd

[11] Patent Number: 4,603,764
[45] Date of Patent: Aug. 5, 1986

[54] BRAKE ACTUATOR FOR BICYCLES AND THE LIKE

[76] Inventor: Winnett Boyd, 107 Victoria Place, R. R. No. 1, Bobcaygeon, Ontario, Canada, K0M 1A0

[21] Appl. No.: 674,292

[22] Filed: Nov. 23, 1984

[51] Int. Cl.⁴ .............................................. B62L 5/00
[52] U.S. Cl. .................................... 192/5; 188/24.17; 192/36
[58] Field of Search ..................... 192/5, 6 R, 6 B, 36, 192/45.2; 188/24.17, 82.1, 82.5, 82.6, 30

[56] References Cited

U.S. PATENT DOCUMENTS

| | | | |
|---|---|---|---|
| 606,334 | 6/1898 | Downer | 192/6 B |
| 639,265 | 12/1899 | Morris | 192/5 |
| 1,866,755 | 7/1932 | Detilloux | 192/5 |
| 4,199,046 | 4/1980 | Boyd | 188/82.5 |
| 4,313,530 | 2/1982 | Boyd | 188/82.6 X |

FOREIGN PATENT DOCUMENTS 300578 9/1932 Italy ....................................... 192/15

Primary Examiner—Rodney H. Bonck
Attorney, Agent, or Firm—Ridout & Maybee

[57] ABSTRACT

A pedal crankshaft operated actuator for a bicycle brake is formed by a yoke having a jaw engageable with one side of the crankshaft, a link pivotally connected to the yoke and having a jaw engageable with the other side of the crankshaft, and a pair of light spring coils surrounding the crankshaft and having a bight engaging the link outwardly of the jaw so that rotation of the crankshaft in a reverse direction locks the spring to the crankshaft and causes the jaws of the link and the yoke to seize the crankshaft. The link folds relative to the yoke to enable the assembly to be inserted into the pedal crankshaft housing, until a lever arm attached to the yoke drops through an aperture in the housing.

4 Claims, 2 Drawing Figures

BRAKE ACTUATOR FOR BICYCLES AND THE LIKE

FIELD OF THE INVENTION

This invention relates to brake actuating means for pedal propelled vehicles such as bicycles. Although the invention is also applicable to pedal propelled vehicles having more than two wheels, e.g. tricycles, it will for convenience hereinafter be explained and described in relation to bicycles, which are by far the most common form of such vehicles, without thereby implying any limitation of the scope of the invention to bicycles.

BACKGROUND OF THE INVENTION AND ART STATEMENT

This invention relates to a development of the brake actuating means described in my U.S. Pat. Nos. 4,199,046 and 4,313,530, which are the most pertinent art known to me. A further impression of the state of the art relating to actuators of the same general type may be obtained by considering the references discussed in the specifications of those patents or cited during their prosecution.

In the actuators described in my prior patents, a one-way clutch element acting on the pedal crankshaft of a bicycle is formed by a spiral coil spring having a central bight engaging a yoke through which braking forces are transmitted, and oppositely handed spiral coils surrounding the crankshaft and extending axially outward along the crankshaft from opposite sides of the yoke. Outward portions of the coils are of relatively lighter gauge and are normally the only portions to engage the crankshaft, thus reducing frictional drag. Development has shown that this arrangement can operate very satisfactorily with very little drag during forward pedalling of the bicycle whilst requiring very little rearward angular motion of the pedals to produce engagement.

Much thought has been given to alternatives to this spring type brake actuator as described in the above patents. Because of the space limitations in the small bottom brackets (the pedal crankshaft housing) of non-North American manufactured bicycles, I do not know of any alternative of comparable performance to my spring type actuator for such bicycles. However, for those North American manufactured bicycles that have large bottom brackets (approximately 2" inside diameter), I have devised an alternative to the above coil type brake actuator.

SUMMARY OF THE INVENTION

According to the invention, there is provided in a device for operating a brake of a pedal operated vehicle, which device comprises a brake operating lever projecting through an opening in a pedal crankshaft housing of the vehicle, two oppositely wound spring coils connected at a bight and concentrically surrounding and frictionally engaging a pedal crankshaft within the housing, and a yoke at an inner end of the lever, said yoke surrounding part of the circumference of the crankshaft, the improvement wherein a linking means is provided, with a pivotal connection at its one end to the yoke and a connection at its other end to the bight, wherein the yoke and the linking means together surround at least half of the circumference of the crankshaft, wherein the linking means has a friction surface engageable at least with an area of the crankshaft diametrically opposed to the yoke, wherein the bight engages the linking means at a location radially outward of the jaw and so that the spring coils extend from the bight around the crankshaft in the same direction as the linking means extends from the yoke, namely in the direction of motion of the crankshaft associated with back pedalling, and wherein the lever, the yoke and the linking means of the device are so dimensioned that in its plane of operation it can be folded at the pivotal connection so that it has no dimension greater than the internal diameter of the pedal crankshaft housing but when the yoke partially surrounds the crankshaft an arm of the lever projects through the opening in the housing beyond its outer surface.

Although the linkage need usually comprise only a single link pivoted to the yoke, multiple links or a resilient strap could be employed. In each case, the yoke in conjunction with the linkage provides, on movement of the crankshaft in one direction relative to the yoke, a self servo effect, causing the shaft to be gripped between the yoke and the jaw, the latter being pulled into engagement with the shaft by the spring. The flexibility of the linkage means that the device can be manipulated to reduce its size during assembly of the actuator into the bottom bracket of a bicycle.

Further features of the invention will become apparent from the following description with reference to the accompanying drawings.

SHORT DESCRIPTION OF THE DRAWINGS

In the drawings:

FIG. 1 is a section through the bottom bracket of a bicycle to which the invention is applied, longitudinally of the bicycle; and FIG. 2 is a fragmentary section through the bottom bracket, transversely to the bicycle in the line A—A in FIG. 1.

DESCRIPTION OF THE PREFERRED EMBODIMENT

Figure 2:
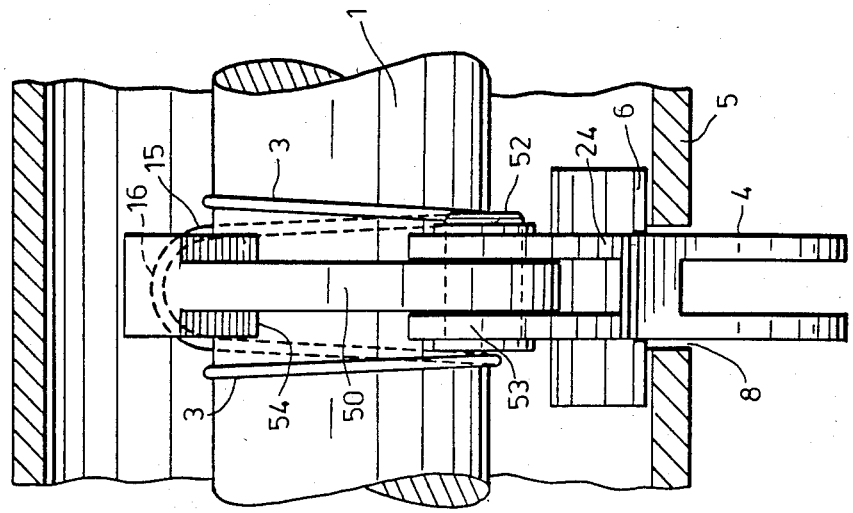

Referring to the drawings, the environment in which the actuator is applied can be readily understood by reference to my U.S. Pat. Nos. 4,199,046 and 4,313,530, the disclosures of which are incorporated herein by reference. Similar reference numerals are used to indicate like parts to those appearing in those patents, where appropriate.

Figure 1:
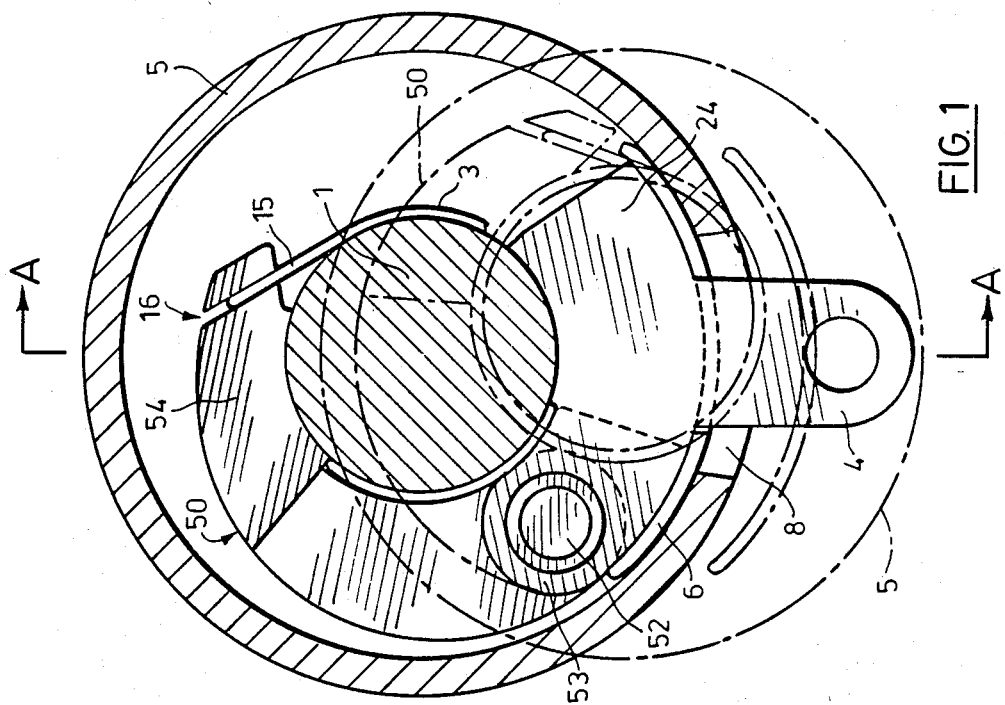

As compared to the embodiment of FIG. 1 of Pat. No. 4,313,530, the spring coils 3 are of simplified construction. The spring wire is of uniform and relatively small cross-section throughout, and may be of conventional circular cross-section. Although only parts of the coils are shown, each will have a number of turns, typically eleven. A bight portion 15 connecting the opposite handed spring coils 3 is engaged in a groove 16 which is formed in the outer surface of the distal end of a curved link 50 which is connected by a pivot 52 to a bifurcated end 53 of a yoke 24 formed at the inner end of an actuating lever 4. The distal end of the link 50 is formed with an arcuate jaw 54 located opposite the lever 4 so that movement of the link about the pivot towards the yoke results in a pedal crankshaft 1 of a bicycle, to which the actuator is applied, being frictionally gripped between the jaw 54 and an opposite jaw formed by the inner surface of the yoke 24. A shield 6 is located between the yoke 24 and a lower bracket 5 of the bicycle, which forms a housing for the pedal crankshaft 1, so as to seal against dirt entering an opening 8 in the bracket 5 through which the lever 4 projects. The link 50, yoke 24 and lever 4 are so dimensioned that in the absence of the crankshaft 1 the link can be folded towards the yoke about the pivot 52 to reduce the overall dimensions of the actuator in its own plane. This reduction enables it to be inserted into the housing 5 from one end (as shown in broken lines in FIG. 1) to a position at which the lever 4 can drop through the slot 8, whereafter the crankshaft 1 can be inserted through the coils 3 and between the jaw 54 and the yoke 24. The link 50 extends around the forward side of the crankshaft, and the coils of the spring 3 extend from the bight in a direction such as to form an extension of the link, the groove 16 being formed radially outwardly of the jaw 54.

In use, normal forward pedalling of the bicycle rotates the crankshaft in such a sense (anticlockwise as seen in FIG. 1) that any drag exerted on the spring coils 3 is such as to tend to unwind and expand the latter so as to reduce the drag. Likewise, such drag tends to move the bight 15 away from the bottom of the groove 16 so that no pull is exerted on the link 50 tending to press the jaw 54 against the crankshaft 1. On the other hand, reverse pedalling causes the drag of the coil 3 to tend to tighten the latter, thus increasing the drag and providing a positive feedback effect which rapidly locks the coils to the crankshaft. This in turn causes the bight 15 to draw the jaw 54 against the crankshaft, and to rotate the link 50 and the yoke 24 with the crankshaft. Movement of the yoke is transmitted by the lever 4 to a brake mechanism, and the reaction from the brake mechanism coacts with the force developed by the springs coils to clamp the jaws formed by the link 50 and the yoke 24 onto the crankshaft. As the force transmitted through the lever increases, so does the clamping force applied by the jaws, which act on the crankshaft in the manner of a pipe wrench.

It is well known that the coefficient of friction between two surfaces increases with the surface pressure even if the surfaces are initially lubricated. In "Machinery's Handbook", 15th Edition, p. 517, is a table of the coefficients of sliding friction of various combinations of metals for different surface pressures. It records that wrought iron on wrought iron seizes at a pressure of 565 psi while cast iron on wrought iron seizes at 780 psi. It is not know at what pressure steel on steel will seize but it is probably somehwere between these two pressures for grades of steel suitable for use for the jaws and crankshaft. The pressure developed on the jaws even by relatively modest back pedalling torques will be well in excess of 2000 psi. Thus, during even modest braking by the bicycle rider the clutch jaws will seize onto the pedal crankshaft so that the majority of the back pedalling torque will be transmitted through the clutch jaws with only the initiating and maintaining torque being transmitted by the spring bight 15.

The bight 15 and inner turns of the spring coils 3 used in this actuator can thus be much less strong than those required in my cited prior patents. Indeed, one of the advantages of this actuator is that the entire double torsion spring can be made of small diameter wire of cross-sectional area similar to that used for the outer coils 3A of the spring coils in the cited patents. The majority of the torque transmission is performed by the jaws gripping the shaft.

The location of the pivot 52 is such that any tendency of the yoke 24 to tilt under the influence of forces applied to it by lever 4 merely serves to draw the jaw 54 more strongly against the crankshaft, producing a reaction resisting the tilt. The action is similar to that of a C-wrench, with the jaw 54 and spring coils 3 providing a function comparable to that of the pawl on the hinged link of such a wrench, and without requiring any teeth or notches on the pedal crankshaft.

In the embodiment so far described the flexibility of the linkage is provided by the pivot 52. If the link 50 was replaced by a multiple link structure, an action would be obtained comparable to that of a chain wrench, or if it were replaced by a resilient strap, the action would be comparable to that of a strap wrench.

I claim:

1. In a device for operating a brake of a pedal operated vehicle, which device comprises a brake operating lever projecting through an opening in a pedal crankshaft housing of the vehicle, two oppositely wound spring coils connected at a bight and concentrically surrounding and frictionally engaging a pedal crankshaft within the housing, and a yoke at an inner end of the lever, said yoke surrounding part of the circumference of the crankshaft, the improvement wherein a linking means is provided, with a pivotal connection at its one end to the yoke and a connection at its other end to the bight, wherein the yoke and the linking means together surround at least half of the circumference of the crankshaft, wherein the linking means has a friction surface engageable at least with an area of the crankshaft diametrically opposed to the yoke, wherein the bight engages the linking means at a location radially outward of the friction surface and so that the spring coils extend from the bight around the crankshaft in the same direction as the linking means extends from the yoke, namely in the direction of motion of the crankshaft associated with back pedalling, and wherein the lever, the yoke and the linking means of the device are so dimensioned that in its plane of operation it can be folded at the pivotal connection so that it has no dimension greater than the internal diameter of the pedal crankshaft housing but when the yoke partially surrounds the crankshaft an arm of the lever projects through the opening in the housing beyond its outer surface.

2. A device according to claim 1, wherein the linking means consists of a curved link and a pivot connecting the link to the yoke.

3. A device according to claim 2, wherein the friction surface is a jaw formed on the inside surface of an opposite end of the link from said pivot.

4. A device according to claim 1, wherein the opening in the pedal crankshaft housing is dimensioned to limit the angular movement of the lever relative to the crankshaft.

* * * * *